(No Model.)

P. P. F. MICHÉA.
TREATING PLANTS CONTAINING INDICAN.

No. 388,703. Patented Aug. 28, 1888.

UNITED STATES PATENT OFFICE.

PAUL P. F. MICHÉA, OF PORT OROTAVA, TENERIFFE, CANARY ISLANDS.

TREATING PLANTS CONTAINING INDICAN.

SPECIFICATION forming part of Letters Patent No. 388,703, dated August 28, 1888.

Application filed April 22, 1886. Renewed February 21, 1888. Serial No. 264,723. (No model.) Patented in India February 7, 1881, No. 97, and June 20, 1883, No. 181; in Queensland October 19, 1883, No. 7, and in France February 11, 1884, No. 160,239.

*To all whom it may concern:*

Be it known that I, PAUL PHILIPPE FRANÇOIS MICHÉA, a citizen of the Republic of France, and at present residing at Port Orotava, Teneriffe, Canary Islands, have invented a certain Improvement in Treating Plants Containing Indican, (for which I have obtained Letters Patent in British India, No. 97, dated February 7, 1881, and No. 181, dated June 20, 1883; also in Queensland, Australia, No. 7, dated October 19, 1883; also in France, No. 160,239, dated February 11. 1884,) of which the following is a specification.

This invention has for its object to obtain a more abundant yield of indigo than has been heretofore accomplished from plants containing indican and to obtain the same of superior quality. Indican is a glucoside body, and it must be liberated from glucose before it yields indigo. The course of treatment hitherto for accomplishing the separation has been to subject the plant containing the indican to a process of steeping and fermentation in a suitable vat; but even after it has been thus "split up" it gives only a small quantity of indigo as compared with the quantity it yields under the treatment with alkalies, principally ammonia, according to my invention. The alkalies inherent in the plant and developed during the fermentation are inadequate to convert the whole of the split-up indican into an oxidizable compound. Consequently in the ordinary method of manufacturing indigo only part of the yield is due to split-up indican so converted, the remaining part of the yield being obtained direct from the split-up indican which has found no alkalies to combine with; but the whole yield is much less (say as one to four or five) than the production by my invention. Therefore there is always in the ordinary process of indigo manufacture an immense loss of the capabilities of split-up indican to produce indigo-blue.

In carrying out my invention I employ the usual upper or steeping vat for splitting the plant under treatment and then introduce the contents of the steeping-vat into a lower or beating vat, where the plants are beaten in the manner hereinafter explained.

The beating-vat is represented in the accompanying drawings, in which—

Figure 1:
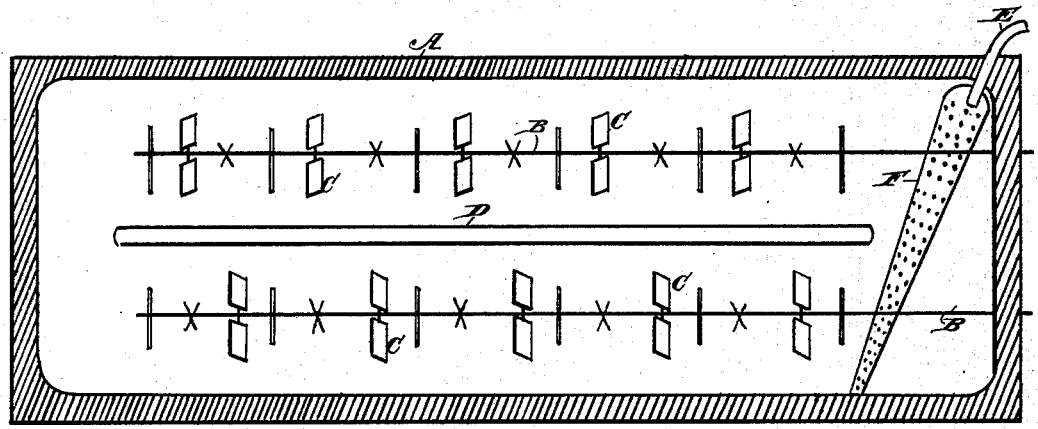
Figure 2:
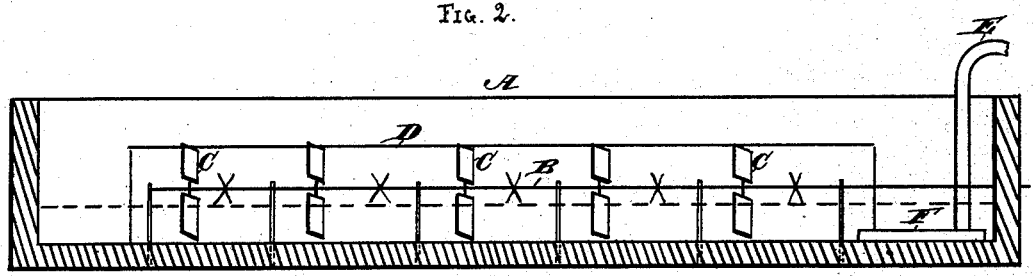
Figure 3:
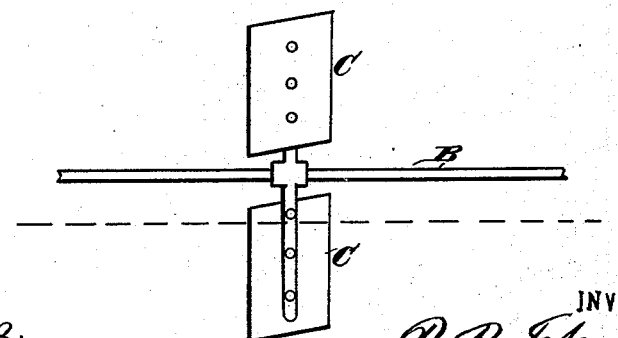

Figure 1 is a plan of a beating-vat. Fig. 2 is a vertical longitudinal section thereof. Fig. 3 is a detail enlarged view of a pair of paddles or beaters.

Similar letters indicate corresponding parts.

The plant to be treated containing indican is steeped under pressure in the steeping-vat with water at its normal temperature, which temperature in the several countries where the plants are grown and at the different periods of the crop varies between about 75° and about 92° Fahrenheit. The usual time of steeping is allowed, but not exceeded. That portion of the ordinary process of manufacture is not changed. The temperature of the liquor after it has been drawn into the lower or beating vat may, with advantage, be raised to about 98° Fahrenheit. This increase of temperature should be effected rapidly, as a slow heat may tend to start again the fermentation of the liquor which had been arrested when it was drawn from the upper or steeping vat. The liquor may be heated up to the degree (98° Fahrenheit) above stated in any suitable way—as, for example, in metal pans or boilers, by means of heated flues under the vats or by passing hot air or steam through pipes laid in the vats and having an exit or discharge outside of said vats, or by discharging steam into the liquor. The latter means I prefer as offering the advantage of cheapness. I claim that this heating treatment of the liquor causes the indigo-paste to be especially soft. When the indigo-liquor has been introduced into the beating-vat, I add thereto slowly ammonia-liquor in about the proportion of two hundred and fifty pounds of liquor ammonia-fortis having a specific gravity of about 0.890 to about one thousand cubic feet of plant pressed in the upper or steeping vat, oxygen being rapidly and freely applied in the beating or oxidizing process that follows. The above quantity (two hundred and fifty pounds of liquor ammonia-fortis, of specific gravity 0.890 per one thousand cubic feet of plant pressed in the steeping-vat) I consider to be the full quantity that may combine with the whole of the split-up indican of average indigo-plant; but this quantity may vary more or less, according to the species of plant under treatment, the more or less indican it contains, the seasons, or climatic influences.

In place of ammonia-liquor of the specific gravity above named I can use an alkalimetric equivalent thereof in liquor ammonia of a higher specific gravity, or I can use a mixture of an equivalent alkalimetric value composed of liquor ammonia and solution of carbonate of ammonia, each of them in alkalimetric proportions, which it is not necessary to define very particularly. I find, however, that it is advantageous not to lower the quantitative limit of the liquor ammonia below the half of the total of the alkalimetric value of the mixture.

Potash or soda, caustic or carbonated, can be used in place of a part of the ammoniacal alkalies stated above; but it is proper to use the same only in small quantities, as potash and soda leave behind them mineral salts, which the indigo they have aided in forming is then found to contain, the said salts materially increasing in the ratio of the quantity of those alkalies when used. In case potash or soda is used I have found it well to use a mixture of half caustic potash and half carbonate of potash, or a mixture of half caustic soda and half carbonate of soda. The quantities of alkalies, limited as above, I consider to be the full quantities necessary for indigo-plant of average quality; but they may vary more or less in accordance with the species of plants treated, the more or less quantity of indican contained therein, the seasons, and other climatic influences.

Ammonia combines with indican or its derivatives contained in and extracted from certain plants by the usual steeping process more readily than any other alkalies, and the dye yielded by the indican when treated with ammonia is of a superior quality to that obtained by former methods. I therefore prefer in my process to use ammonia-liquor only or ammonia-liquor conjointly with a solution of carbonate of ammonia. After adding the ammonia-liquor, I pour into the beating-vat a solution of nitrates or nitrites of ammonia, potash, or soda at the rate of about five pounds or more of one of these salts to about one thousand cubic feet of plant, thoroughly mixing it with the liquor of the vat, and the beating or oxidation process is then commenced and carried on as effectually as can be done.

I have found that the best results in the oxidizing process are obtained with a shallow depth of liquor in the beating-vat, as in that case rapid agitation of the liquid can be more effectually produced. The agitation can be accomplished by hand or by machinery, as preferred. The apparatus represented in the accompanying drawings contains a practical form of a beating-vat.

In the drawings, the letter A designates a vat or vessel. In the vat are placed one or more shafts B. By having one end of the shaft pass outside of the vat such end of the shaft can be connected outside of the vat with a pulley or suitable device to give motion to the shaft. On the shaft at suitable intervals are beaters or blades C. The blades are placed in an inclined position, as seen in the drawings. These blades C enter the liquor in the beating-vat, and when the shaft B is revolved the blades or beaters C agitate and mix the liquid. The inclined position of the blades aids in securing thorough agitation and mixture. The blades C may be made of sheet-iron or other suitable material and riveted or otherwise properly secured to arms or stays projecting from the shaft B. By mounting the blades so that they can be turned about their supporting arms or stays said blades C can be fixed at varying angles to the shaft B. If the beating-vat A is of considerable size, two or more shafts B, with paddles or beaters C, can be suitably mounted in the vat or receiver. If two shafts are used, the paddles C on one shaft are advantageously inclined in a reverse position to the paddles or beaters on the other shaft, whereby thorough mixing of the contents of the said vat is secured. In case more than two shafts B, with beaters or paddles, are used, the inclinations of the various series of paddles are advantageously made to alternate with one another, so as to secure thorough mixing. A partition or partitions, D, may also be placed in the vat, so as to separate or partially separate the various currents in the vat.

E indicates a tube or pipe, through which atmospheric air and ozonized air are blown or forced into the contents of the beating-vat. The tube E can be connected with an air-pump or with a fan-blower or with any other air-forcing apparatus. The outlet F of the injection-tube E is preferably made in the shape of a distributer, consisting of a conduit or box of wood, iron, or other suitable material and provided with a series of small discharge-openings.

The temperature of the air forced into the liquid can be raised to the temperature of the liquor itself. Ozonized air may be obtained by the usual process of discharging electric flashes or sparks in atmospheric air. If ozonized air is forced or injected into the liquid, such injection is arrested just before the contents of the vat change from a green color to a blue color, and the oxidation is completed by ordinary atmospheric air.

The use of nitrates or nitrites above indicated is of advantage, as it facilitates and accelerates the action of alkalies on the indigo-liquor, and also as it gives rise to a product which can be formed into indigo-cakes of cubical or other suitable form, and which cakes are of solid form and devoid of cracks or breaks.

The remaining operations connected with the manufacture of indigo remain the same as ordinarily practiced before.

Instead of applying the treatment above set forth to the indigo-liquor in a beating-vat, I can apply said treatment to the indigo-liquor in the steeping-vat by mixing the alkalies and the nitrates or nitrites in the proportions and quantities designated above with the water which is poured on the plant and going through the various steps of steeping, fermenting, raising the temperature of the liquor, beating and oxidizing, as above set forth; but as a strongly alkaline liquid extracts not only the indican from the plant, but also substances, such as gum, chlorophyl, extractive matters, salts, and other bodies which lower the quality of the indigo-liquor for the production of indigo, and, as ordinary water extracts during the customary time of steeping only a small part of these objectionable bodies, while thoroughly extracting the indican, it is preferable that the chemical treatment above set forth be applied in the beating-vat and not in the steeping-vat.

This invention makes use of the affinity which alkalies, and principally ammonia, have for attaching themselves to or combining with indican and forming therewith compounds which are more readily oxidizable than indican by itself. The yield of indigo obtained is considerably increased by my process and waste is avoided.

As I have found that the dye obtained by the use of ammonia is of a superior quality, I prefer to use only ammonia-liquor or ammonia-liquor with a solution of carbonate of ammonia.

If caustic or carbonated potash or soda is used, only small quantities of these alkalies should be employed, because of the formation of mineral salts, to which they give rise, as above stated.

The addition of ammonia to the liquor in the beating-vat in the proportions hereinbefore indicated converts, approximately, the whole of the split-up indican into the compound or compounds above referred to, so that the effective mode of oxidation herein described results in the largest possible yield of indigo from the split-up indican.

What I claim as new, and desire to secure by Letters Patent, is—

1. The method of manufacturing indigo, consisting in the introduction into the indigo-liquor during the process of manufacture of caustic ammonia, which combines with the indican of the plant under treatment and produces a product of superior quality, substantially as described.

2. The method of manufacturing indigo by introducing nitrate or nitrite of ammonia into the indigo-liquor during the process of manufacture to accelerate the action of alkalies on the indigo-liquor and to act on the gluten of the plant which is in solution, substantially as described.

3. The method of manufacturing indigo by introducing ammonia into the indigo-liquor and oxidizing the indigo-liquor during the process of manufacture, substantially as set forth.

4. The method of manufacturing indigo by introducing ammonia and atmospheric and ozonized air into the indigo-liquor during the process of manufacture, substantially as set forth.

5. The method of manufacturing indigo by introducing ammonia into the indigo-liquor and agitating, oxidizing, and ozonizing the indigo-liquor during the process of manufacture, substantially as set forth.

In testimony whereof I have signed my name to this specification in the presence of two subscribing witnesses.

P. P. F. MICHÉA.

Witnesses:
PABLO MARTINE,
CAYETANO SANSON.